UNITED STATES PATENT OFFICE.

WHITNEY B. JONES, OF PERTH AMBOY, NEW JERSEY, ASSIGNOR TO GENERAL BAKE-
LITE COMPANY, OF NEW YORK, N. Y., A CORPORATION OF NEW YORK.

COATED ARTICLE.

1,171,725.     Specification of Letters Patent.     Patented Feb. 15, 1916.

No Drawing.     Application filed March 5, 1913. Serial No. 752,231.

*To all whom it may concern:*

Be it known that I, WHITNEY B. JONES, a citizen of the United States, residing at Perth Amboy, in the county of Middlesex and State of New Jersey, have invented certain new and useful Improvements in Coated Articles, of which the following is a specification.

This invention relates to metallic or other articles coated with polymerized phenolic condensation products, the object of the invention being to provide such articles with a coating which is not only resistant to chemical action but is sufficiently flexible and adherent to withstand moderate shocks or blows and all ordinary usage.

It is well known that certain phenolic condensation products containing methylene groups are, after baking, highly resistant to chemical agents; and such products have heretofore been employed, either alone or in conjunction with finely-divided materials serving to reduce their shrinking stresses and to improve their adherence, for coating metal surfaces, as for instance the interior surfaces of cans and similar containers. According to the present invention, I employ in conjunction with such baked highly-resistant exposed coatings, an intermediate varnish coating which is more flexible in character, and which is characterized by possessing a high degree of adherence both to the metal or other surface which constitutes the base, and to the phenolic condensation product which constitutes the exterior coating. As a result, I am able to obtain a composite coating which combines the advantage of resistance to all ordinary chemical reagents, with a marked capability for withstanding the conditions encountered during handling or shipment of the coated articles.

An illustrative embodiment of the invention is as follows: A metal surface, as for instance a sheet or article of iron or steel, whether previously tinned or not, is coated with an appropriate oil varnish, with which a finely-divided pigment or filling material may be incorporated, if desired. A suitable oil varnish may be prepared from pure linseed oil, boiled to suitable consistence with the usual driers, and afterward thinned with any of the well known varnish solvents; or instead of pure linseed oil varnish, I may use oil varnishes containing hard gums, or varnishes composed of mixtures of linseed oil with China wood oil or other quick-drying oil. The varnish may be applied clear, or especially when relatively thick coatings are desired, it may be mixed with finely-powdered silica or other inert fillers. This coating is then hardened, preferably by baking. The coating of phenolic condensation product is then applied over the oil varnish, and likewise baked, during which baking polymerization occurs and the product becomes insoluble in all ordinary solvents. Such condensation product may be prepared according to any of the methods now well understood in the art, for example as described in United States Patents 954,666, 957,137, 1,037,719 to L. H. Baekeland. The result of this procedure is a metal or other base having applied thereto a composite coating whereof the first layer is in direct contact with the base, is capable of adhering strongly thereto, and possesses a marked degree of flexibility or toughness; while the second or exposed layer consists essentially of a highly-resistant, polymerized phenolic condensation product which adheres strongly to the first layer, and is, therefore, under all ordinary conditions of usage, inseparable from the base. The effect is due to the observed fact that the phenolic condensation product, when polymerized upon the surface of the oil varnish, has an abnormal adherence thereto; while the oil varnish in turn exhibits, as compared with the phenolic condensation product, a very high degree of adherence to the base.

The layer of phenolic condensation product may be applied clear, or mixed with other materials, such as inert pigments, coloring matters, or fillers.

I claim:

1. A coated article, comprising a metallic or other base, an exterior coating containing a polymerized phenolic condensation product, and an intermediate varnish coating, said intermediate varnish coating capable of adhering strongly both to said base and to said exterior coating.

2. A coated article, comprising a metallic or other base, an exterior coating containing a polymerized phenolic condensation product, and an intermediate relatively flexible varnish coating, said intermediate varnish coating capable of adhering strongly both to said base and to said exterior coating.

3. A coated article, comprising a metallic or other base, an exterior coating containing a polymerized phenolic condensation product, and an intermediate coating containing an oil varnish, said intermediate coating capable of adhering strongly both to said base and to said exterior coating.

4. A coated article, comprising a metallic or other base, an exterior coating containing a polymerized phenolic condensation product, and an intermediate coating containing a linseed oil varnish, said intermediate coating capable of adhering strongly both to said base and to said exterior coating.

In testimony whereof I affix my signature in presence of two witnesses.

WHITNEY B. JONES.

Witnesses:
LOUIS M. ROSSI,
WILLARD L. BRUNER.